United States Patent [19]

Preusser et al.

[11] Patent Number: 4,488,936
[45] Date of Patent: Dec. 18, 1984

[54] HEAT INPUT CONTROL OF AN EXTRACTIVE DISTILLATION COLUMN

[75] Inventors: Gerhard Preusser; Klaus Richter, both of Essen; Martin Schulze, Neviges, all of Fed. Rep. of Germany

[73] Assignee: Krupp-Koppers GmbH, Essen, Fed. Rep. of Germany

[21] Appl. No.: 474,315

[22] Filed: Mar. 10, 1983

Related U.S. Application Data

[63] Continuation-in-part of Ser. No. 410,819, Aug. 23, 1982, abandoned, which is a continuation of Ser. No. 135,626, Mar. 31, 1980, abandoned.

[30] Foreign Application Priority Data

Apr. 21, 1979 [DE] Fed. Rep. of Germany ....... 2916175

[51] Int. Cl.³ ............................. B01D 3/42; C07C 7/08
[52] U.S. Cl. .......................................... 203/1; 203/2; 203/3; 203/58; 203/DIG. 9; 202/160; 202/206; 585/860; 585/865
[58] Field of Search ........................ 203/1-3, 203/58, DIG. 9; 202/160, 206; 208/DIG. 1; 196/132; 585/860, 865

[56] References Cited

U.S. PATENT DOCUMENTS

| | | | |
|---|---|---|---|
| 2,684,326 | 7/1954 | Boyd | 202/160 |
| 2,893,927 | 7/1959 | Mertz et al. | 202/160 |
| 2,917,437 | 12/1959 | Kleiss et al. | 202/160 |
| 3,050,450 | 8/1962 | Kleiss et al. | 202/160 |
| 3,111,460 | 11/1963 | Orr | 202/160 |
| 3,660,247 | 5/1972 | Franks | 203/1 |
| 3,803,002 | 4/1974 | Skraba et al. | 202/160 |
| 3,953,300 | 4/1976 | Ginnasi et al. | 203/58 |
| 4,019,964 | 4/1977 | Fickel | 202/160 |
| 4,081,355 | 3/1978 | Preusser et al. | 203/58 |
| 4,191,615 | 3/1980 | Schulze et al. | 203/58 |

*Primary Examiner*—Wilbur Bascomb
*Attorney, Agent, or Firm*—Michael J. Striker

[57] ABSTRACT

A process and apparatus are provided controlling the heat input of an extractive distillation column. The bottom of the column is heated with a major stream of thermal energy which is either slowly varying in time or controlled by the amount of starting material mixture and with a minor stream of thermal energy which is controlled by sensing the thermodynamic state in the upper half of the column during the process. The major stream can provide about 90 percent and the minor stream about 10 percent of the heat fed to the column. The minor stream can be controlled by the temperature at one point in the upper half of the column, by the temperature difference at two points in the upper half of the column or by gas chromatographic analysis of the extract material concentration near the top of the column. The process allows one to keep a low concentration of the extract material in the raffinate.

17 Claims, 2 Drawing Figures

HEAT INPUT CONTROL OF AN EXTRACTIVE DISTILLATION COLUMN

This application is a continuation-in-part of prior application Ser. No. 410,819, which is in turn a continuation of prior application Ser. No. 135,626 both of these applications are now abandoned.

BACKGROUND OF THE INVENTION

The present invention relates to a process and an apparatus controlling the amount of thermal energy fed to the bottom of an extraction column for separating mixtures of materials.

Extractive distillation is a widespread practical and useful process for separating mixtures of materials and in particular of hydrocarbons, which cannot or can only partially be separated by distillation based on the boiling points of their components. In contrast to the liquid-liquid extraction frequently employed for separations of this nature, extractive distillation exhibits a number of advantages relating to apparatus construction and process engineering. For example, extractive distillation requires only two distillation columns. The solvent employed in extractive distillation is generally anhydrous. This eliminates the requirement of separate water circuits. Furthermore, in extractive distillation the viscosities of the extractant are lower based on the higher employed temperatures and this improves considerably the mass transfer between the extractant and the material to be extracted. This results in an improved loading and for the same throughput, smaller amounts of extractant are sufficient. The obtainable advantages in apparatus construction result in considerably smaller capital costs for an extractive distillation plant compared to those of a liquid-liquid extraction plant. The operating costs are also lower and are sometimes only about fifty percent of those of a corresponding liquid-liquid extraction plant.

In liquid-liquid extraction the formation of two liquid phases is a precondition for successful separation of the starting materials. Ideally, one phase of the liquid-liquid extraction process consists of the extractant and of the components of the extract and the other phase consists of the components of the raffinate. It is however frequently necessary in liquid-liquid extraction to add water to the extractant for improving the selectivity and for favoring the formation of two liquid phases. Adding water results in the requirement of separate water circuits which contributes to the increase of the capital costs of a liquid-liquid extraction plant.

The situation for extractive distillation is completely different. The separating effect is based in this case on the change of the vapor pressures of the individual components present in the mixture to be separated in the presence of the extractant. The changes are in the direction as to increase the vapor pressure differences between the components to be separated into either the extract or into the raffinate. Thus the raffinate can be distilled off at the top of the extractive distillation column as the lower boiling fraction. All deviation from normal of the streams of thermal energy fed to the extractive distillation column effect the top product forming the raffinate and the composition of the raffinate can vary considerably in its composition depending on the amount of heat fed to the extractive distillation column and on the composition of the mixture to be separated. In general there is found an increase in the amount of the components of the extract in the raffinate.

The practical consequences of this situation can be gathered from the following example relating to the extractive distillation for separation of aromatic hydrocarbons from varying starting materials. As is known, the desired aromatic compounds are removed at the bottom of the column together with the extractant as the extract and the nonaromatic compounds are removed at the top of the extractive distillation column as the raffinate. Taking as the starting point that the raffinate contains in each case still about 20 weight percent of aromatic compounds, which is the situation in usual cases wherein the heat input of the extractive distillation column is controlled according to the state of the art, then the losses of aromatic compounds are as follows in dependency on the contents of nonaromatic compounds in the starting materials:

| Starting material | Nonaromatic compounds in the starting material | Losses of aromatic compounds |
| --- | --- | --- |
| Coke oven benzene | 4 weight percent | 1.04 weight percent |
| Pyrolysis gasoline | 20 weight percent | 6.25 weight percent |
| Pyrolysis gasoline | 30 weight percent | 10.71 weight percent |

The above figures indicate that the losses of aromatic compounds are more severe in the cases of higher content of non-aromatic compounds in the starting materials. It is desired to obtain low losses of aromatic compounds in the magnitude of from about one to three weight percent.

Therefore, employing extractive distillation for purifying starting materials containing large amounts of nonaromatic compounds is only of technical interest if it is possible to keep the content of aromatic compounds in the raffinate low and thereby to limit the losses in aromatic compounds. Calculations have shown however that variations in the amount of heat input into the extractive distillation column in the magnitude of 0.009 percent of the total heat input result in a variation of the content of aromatic compounds in the raffinate of about one weight percent. This illustration underlines clearly the necessity of providing an extremely accurate and well defined control of the heat input to the extractive distillation column.

It is usual in distillative separation processes to control the heat input to the reboilers at the bottom of the columns depending on the top and/or bottom temperatures. It is also conventional to maintain the thermal status of the column via changes in the amount of reflux and or reflux temperature. Furthermore the heat input to the reboilers of the distillation column has been controlled in the past depending on the amount of product at the top.

In particular in extractive distillation it has been proposed to control the amount of heat input to the extractive distillation column by changing the amount of extractant entering at the top into the extractive distillation column. This results in the disadvantage of continuously varying the ratio of extractant to starting material from the ratio providing an optimal separation, which should be employed at constant value for economic separation operations. Changing the amount of extractant entering at the top further results in lower yields and lower grades of purity of the product obtained. It has also been tried in practice to control the heat input to the reboilers at the bottom of the extraction column depending on the temperature sensed at one of the upper column plates, and the measured temperature value then serving for example for controlling the steam input of the reboiler.

As a matter of fact, the above indicated methods are insufficient for providing the accuracy of the heat input of the extractive distillation column which is required in practice for maximizing the yields.

SUMMARY OF THE INVENTION

It is therefore an object of the present invention to provide a process for controlling the amount of heat fed to the bottom of an extractive distillation column which meets the requirements as to accuracy and plant safety.

It is another object of the present invention to provide a process and apparatus for extractive distillation resulting in low contamination of the raffinate with extract material.

These and other objects and advantages of the present invention will become evident from the description which follows.

The present invention provides a process for controlling the heat input of an extractive distillation column. A major stream of thermal energy, which is either slowly varied over time or controlled by the amount of starting material fed to the column, heats the bottom of the extractive distillation column and a minor stream of thermal energy, which is controlled by sensing the thermodynamic state in the upper half of the column during the process, is fed to the bottom of the column. Preferably the major stream comprises from about 80 to 90 percent of the thermal energy and the minor stream of thermal energy comprises from about 10 to 20 percent of the thermal energy fed to the extractive distillation column. The minor stream of thermal energy can be controlled by a temperature sensor in the upper half of the extractive distillation column. Preferably the minor stream of thermal energy is controlled by the temperature difference at two points in the upper half of the extractive distillation column. The minor stream of thermal energy can also be controlled by the concentration of the extract material at a point in the upper half of the extractive distillation column. Preferably this concentration is determined with a gas chromatograph.

The major stream of thermal energy can be slowly varied according to the strongly attenuated magnitude of the minor stream of thermal energy. Preferably the sensors for controlling the minor stream of thermal energy are located at a distance about from 5 to 20 percent of the length of the extractive distillation column from the top of the extractive distillation column. The major stream and the minor stream of thermal energy to the extractive distillation column are preferably provided by at least one reboiler. More preferred is the use of at least two reboilers and at least two different heat carriers. Advantageously the minor stream of thermal energy is provided by a separate reboiler which employs a separate and distinct heat carrier.

The choice of N-formylmorpholine as specific extractant is based on the combination of higher selectivity with satisfactory dissolving ability for the non-aromatics. Further particulars in this regard, as well as a comparison with other solvents, appear in the journal "vt-export journal '82", pages 48–50, "Aromatics by NFM- better economy" by Klaus Lackner, which is incorporated by reference herein.

On the one hand, the use of N-formylmorpholine as a solvent is already known. However, on the other hand, upon use of this solvent, particular conditions must be maintained in order to assure its optimal effectiveness. In particular, the extractive distillation column must be operated without reflux, since use of a reflux will strongly reduce the selectivity of the solvent. Through the omission of reflux and the therewith connected improved activity, however, the requirements with regard to precision in regulating the heating of the column are substantially increased in comparison to operating with reflux. Moreover, in the interest of maximizing yield, as well as avoiding miscibility gaps, the temperature conditions, particularly in the upper part of the column, must be strictly observed. These high requirements of temperature regulation were therefore the starting point for the present invention, since it has been shown that with the previously known methods of normal distillation technique, the necessary precision of heat supply to the extractive distillation column cannot be guaranteed.

The present invention also provides an extractive distillation apparatus which comprises an extractive distilation column, a source of extractant connected to the extraction column, a source of starting material connected to the extractive distillation column, a conduit connected to the extractive distillation column for removing the raffinate, a conduit connected to the extractive distillation column for removing the residue containing the extract and the extractant, heating means at the bottom of the column, a major source connected to and feeding thermal energy to the heating means and a controlled minor source connected to and feeding thermal energy to the heating means. Preferably the apparatus comprises a sensor for sensing the amount of starting material fed to the column for controlling the major source of thermal energy. The major source of thermal energy advantageously provides at least about 80 percent of the thermal energy to the extractive distillation column. A sensor can be provided depending on the temperature of the fluid in the upper third of the extractive distillation column and connected to the minor source of thermal energy. Preferably, two sensors are employed depending on the temperature of the fluid and located at different levels in the upper part of the extractive distillation column and connected to the minor source of thermal energy for controlling the output of the minor source by means of the temperature difference at different levels.

A gas chromatographic sensor can be connected to the minor source of thermal energy and be located in the upper third of the extractive distillation column for providing a signal depending on the concentration of the extract materials in the fluid to the minor source. A connection from the minor source of thermal energy to the major source of thermal energy can be provided for varying the thermal energy output of the major source of thermal energy in accordance with the strongly attenuated output of the minor source. A sensor connected to the minor source of thermal energy is preferably located in the area of from about 5 to 20 percent of the length of the extractive distillation column, measured from the top of the extractive distillation column. The major source and the minor source of thermal energy preferably comprise at least one reboiler. Advantageously the major source and the minor source of thermal energy comprise at least two reboilers and at least two different heat carriers. It is desirable that the minor source of thermal energy comprises at least one separate reboiler connected to the extractive distillation column.

The novel features which are considered as characteristic for the invention are set forth in particular in the appended claims. The invention itself, however, both as to its construction and method of operation, together with additional objects and advantages thereof, will be best understood from the following description of specific embodiments, when read in connection with the accompanying drawing.

BRIEF DESCRIPTION OF THE DRAWINGS

In the accompanying drawings in which is shown one of the various possible embodiments of the invention.

DESCRIPTION OF THE PREFERRED EMBODIMENTS

In accordance with the present invention, the total heat fed to the bottom of an extractive distillation column is parted into two separate partial amounts of heat. The larger or major amount of heat can be controlled by the amount of starting material fed to the extractive distillation column or can be a constant amount for equal time intervals or can be a slowly varying function. The smaller or minor part of the heat can be controlled by an additional control function preferably provided by a sensor. The larger part of the heat is preferably from about 80 to 90 percent of the total heat input and more preferably around 90 percent and the smaller part of the heat provided by the minor source is preferably 10 to 20 percent and most preferably about 10 percent of the total heat fed to the extractive distillation column.

There are several possibilities for controlling the smaller part of the heat input into the column. The smaller part of the heat can be controlled either depending on the temperature of the liquid at one level in the upper part of the extractive distillation column or depending on the difference of the temperatures of the liquid at two different levels in the upper part of the extractive distillation column.

It is also possible to control the smaller amount of heat for fine tuning by means of a gas chromatograph connected to a plate in the upper part of the extractive distillation column and sensing the concentration of the material to be extracted.

Furthermore a circuit can be provided for changing the set point of the major heat source slowly in accordance with the actual output of the minor heat source after strong attenuation for maintaining the fine tuning control in a most effective working range. The above indicates that the sensing points should be located for the minor heat source on the plates of the upper part of the extractive distillation column. It has proved to be advantageous to have the sensing points on plates located in the range of from about 5 to 20 percent of the length of the extractive distillation column, measured from the top of the extractive distillation column and preferably at a distance of about 12 to 18 percent. For example when the extractive distillation column comprises 60 plates a preferred plate would be the ninth plate from the top.

The heat required for the extractive distillation column can be provided by one or more reboilers. When more than one reboiler is employed, they can be operated with different heat carriers such as steam, heat carrier oils or with hot extractant, which is fed back to the entering point on the extractive distillation column after heat exchange via one or more reboilers. Naturally, the smaller part of the heat input of the extractive distillation column can be provided by a separate reboiler, and this reboiler can be operated with a heat carrier which is different from the other heat carriers.

Figure 1:
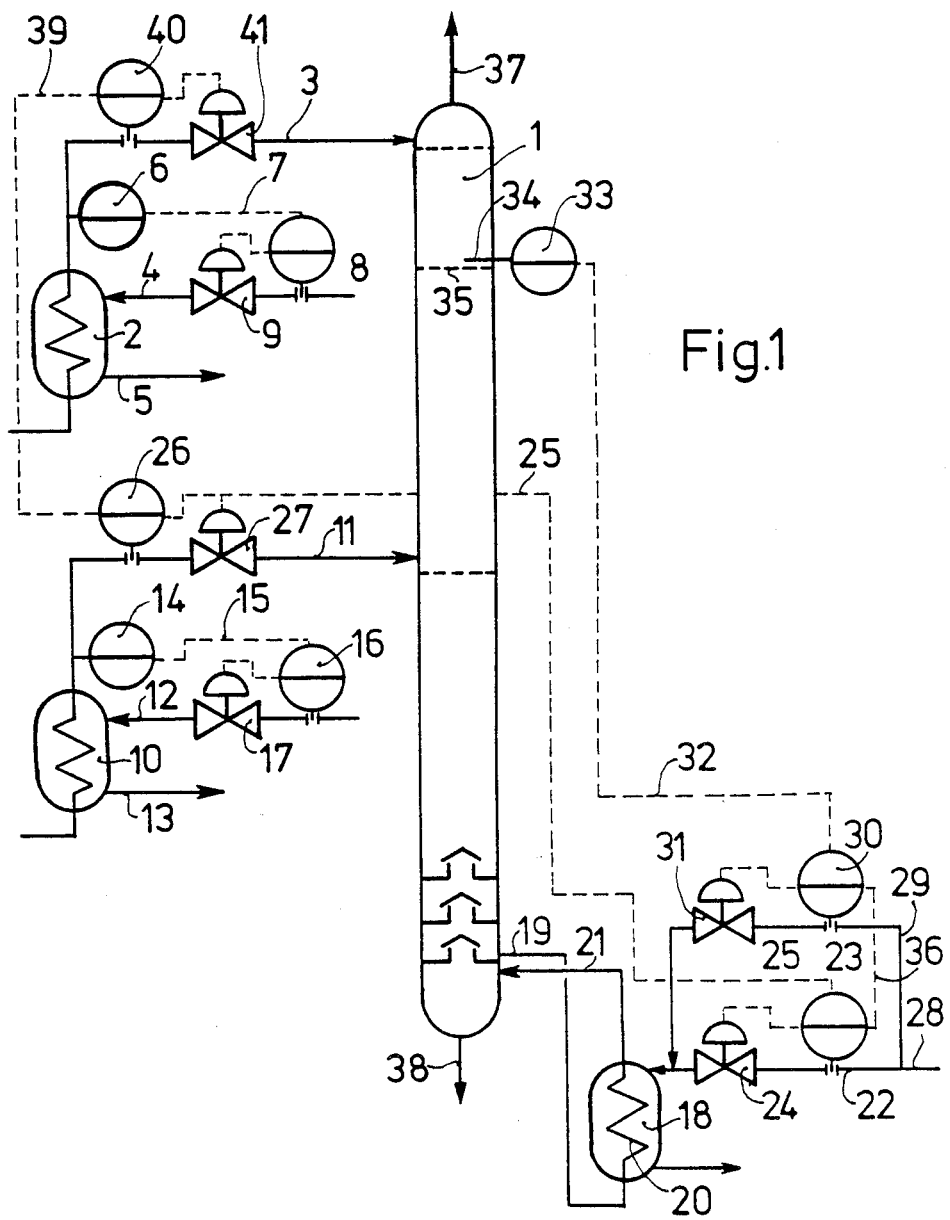
FIG. 1 is a schematic representation of an extractive distillation column with supporting apparatus employing the extractive distillation process of the present invention.

Referring now to FIG. 1, the extractive distillation column is designated as 1. The extractant is fed to the head of the extractive distillation column 1 through the condenser 2 and the conduit 3. The cooling means such as water for cooling the extractant is fed to the condenser 2 via line 4 and withdrawn via line 5. A temperature sensor 6 can be placed in line 3 for providing the temperature of the extractant flowing to the extractive distillation column 1. The signal from the sensor 6 can be transferred to the flow controller 8, which controls via valve 9 the amount of cooling means flowing through line 4. Possibly, the cooling of the extractant could also be obtained by air cooling. In this case the temperature sensor 6 controls the cooling power of the fan employed for providing the extractant at the desired temperature to the extractive distillation column 1.

The starting material mixture is fed via the heater 10 and the conduit 11 to the middle of the extractive distillation column. The heat carrier for heating the starting material mixture is fed to the heater via conduit 12 and withdrawn from the heater via conduit 13. Similar to the control of the extractant there is also provided in conduit 11 a temperature sensor 14. The signal from the temperature sensor 14 is fed via line 15 to the flow controller 16. The flow controller 16 controls via valve 17 the input of heat carrier in line 12.

A reboiler 18 is provided at the bottom part of the extractive distillation column 1. The reboiler 18 can be connected as a circulating or as a non-circulating reboiler. For example the extractant loaded with the material to be extracted can be withdrawn from the lowest plate or from a low plate of the extractive distillation column through line 19 and enters the coil of pipe 20 of the reboiler 18 providing the required heating. The heated product returns via line 21 to the extractive distillation column 1 and is fed in below the point of withdrawal.

In accordance with the present invention, the heat input to the reboiler 18 of the extractive distillation column 1 is controlled as follows: The flow controller 23 connected to the valve 24 is installed in the conduit 22 which provides to the reboiler 18 the required heat carrier. The flow meter 26 is connected to the flow controller 23 via the pulse line 25. Flow meter 26 is installed in conduit 11. The amount of starting material mixture flowing through conduit 11 to the extractive distillation column 1 is controlled by valve 27 and is sensed by the flow meter 26. The output of the flow meter 26 is fed to the flow controller 23 actuating the valve 24. The control range of the flow controller 23 is set according to the present invention to provide from about 80 to 90 percent of the heat input with a suitable heat carrier via conduit 22 and valve 24 to the reboiler 18. The remaining amount of heat is carried by the employed heat carrier through the bypass conduit 29. The flow controller 30 and the valve 31 are attached to the bypass conduit 29. The flow controller 30 is connected to the sensor 33 via pulse line 32. The point of the sensing element 34 is located at one of the upper plates of the extractive distillation column 1. As indicated above the sensor 33 can include a temperature sensor or gas chromatograph. The temperature of the liquid on the sensor plate 35 or the concentration of the extract material in case a gas chromatograph is employed is used for providing a control signal via pulse line 32 to the flow controller 30. The flow controller 30 actuates the valve 31 and thereby controls the flow of the heat carrier through the bypass conduit 29 to the reboiler 18 for providing the smaller part of the heat fed to the extractive distillation column.

In addition, the flow controller 30 and the flow controller 23 can be connected via a pulse line 36. This provides an additional possibility of control allowing for changing of the set point of the flow controller 23 via the pulse line 36 proportional and in strongly attenuated form to the actual value of the flow controller 30. This allows to keep the fine tuning within an optimal range of control. For example, the flow controller 30 can be set to generate a control signal for the flow controller 23 when the amount of heat controlled by the flow controller 30 exceeds a certain amount of the total heat, for Example 20 percent. This control pulse is then transferred via pulse line 36 to the flow controller 23 and effects a corresponding increase in the heat input to the reboiler 18 via conduit 22. It is also possible to provide for a control transfer in opposite direction as to provide upon exceeding of a certain value in the flow controller 23 a corresponding control pulse to be transferred to the flow controller 30.

The feed of extractant via line 3 to the extractive distillation column can be further controlled via the flow meter 26 for assuring a constant ratio of starting material mixture to the amount of extractant. Then the value determined in the flow meter 26 is additionally fed via pulse line 39 to the flow controller 40 for actuating valve 41.

The raffinate is withdrawn via conduit 37 and the extract is withdrawn via conduit 38 from the extractive distillation column 1. The further processing is performed conventionally.

The process of the present invention is shown in FIG. 1 in a simplified way. For example, constructive details of the extractive distillation column are not presented. Such a column can be a conventional column such as a valve tray or bubble tray column. The control and sensing units can employ conventional devices.

It can be recognized that compared to the embodiment shown in FIG. 1 various changes and modifications can be employed. For example, the amount of heat passing through conduit 22 can be set to a fixed value within the range permissible in accordance with the present invention and in this case the control based on the flow meter 26 can be eliminated. This is possible in particular when starting up a plant or in case the starting material mixture does not vary considerably with respect to the amount fed, the temperature and the composition. Furthermore the heat amount fed in through the bypass conduit 29 can also be fed to a separate reboiler, 18' and the conduit employed for this purpose and the separate reboiler, 18' can be operated with a different heat carrier than the one employed with reboiler 18. The heat transfer to the column is shown in a very simplified fashion in FIG. 1, since in practical applications usually instead of a single reboiler there are attached several to the bottom of the extractive distillation column which can be operated in accordance with the present invention. Instead of sensing the temperature at one individual plate 35 this can be changed to sensing at two plates and the resulting temperature difference can provide the control signal which is transferred to the flow controller 30.

Figure 2:
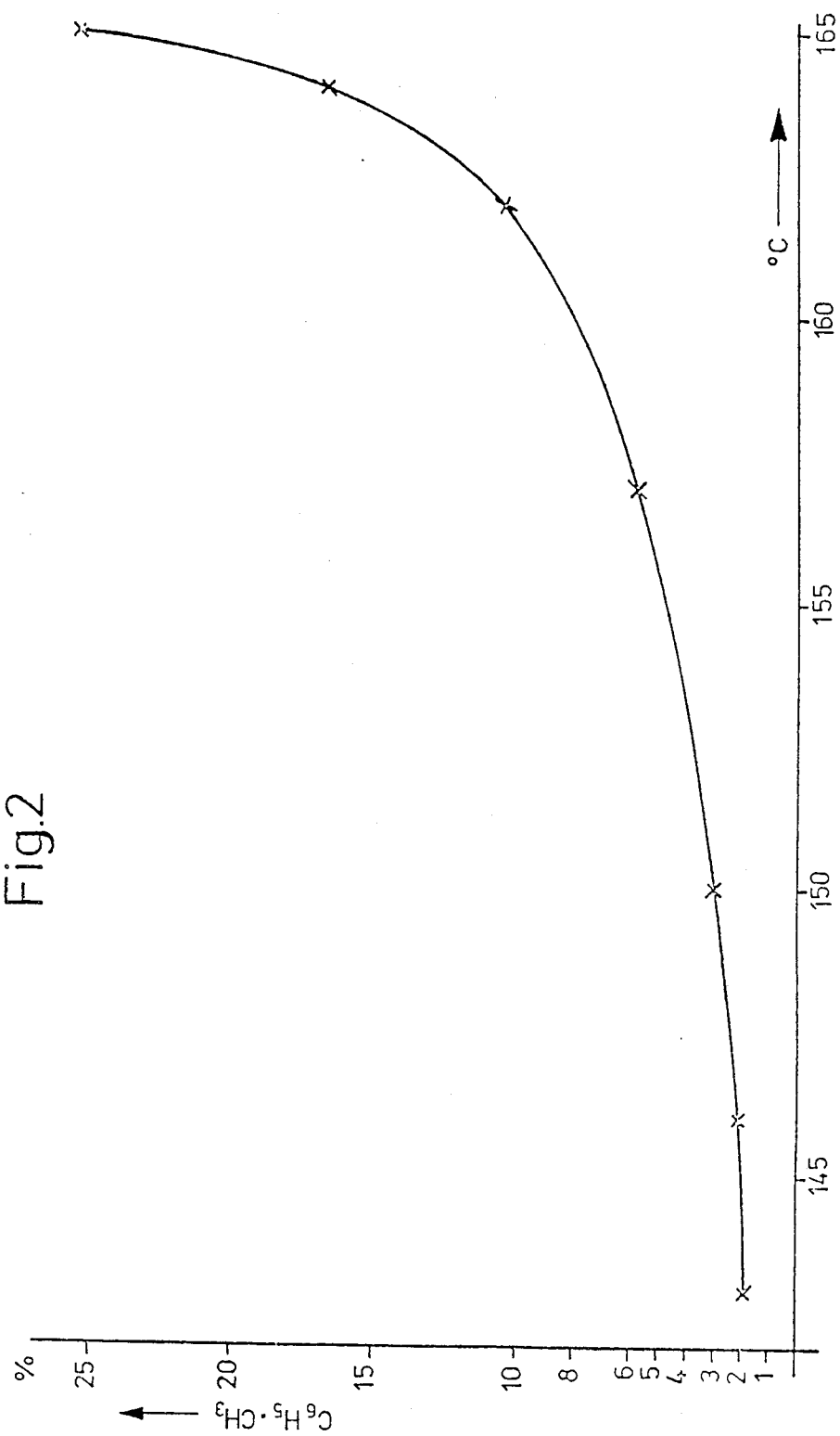
FIG. 2 is a graphic representation of an application example showing the concentration of hydrocarbons of the extract (toluene) in the raffinate depending on the corresponding temperature of the liquid at the sensing level in the column.

The graphic representation of FIG. 2 underlines the importance of operating in accordance with the present invention. By way of example of a toluene fraction there is shown the effect of temperature on the composition of the raffinate in the extractive distillation column. It is desired to separate the toluene from the nonaromatic components which go into the raffinate. The effectiveness of the extractive distillation is the better the lower the content in toluene is in the raffinate. In this case the extractive distillation was performed with a column having 60 plates and the extractant N-formylmorpholine was fed into the column at the top and the starting material at the 33rd plate from the top. The amount of heat fed in at the bottom of the column was slowly increased in order to establish a relationship between the temperature of the liquid at the upper plates of the column and the toluene concentration in the raffinate phase. At the same time the temperature of the liquid was measured at the eighth plate from the top and the corresponding toluene concentration of the raffinate phase was determined. The resulting values were plotted in a coordinate system graphically and the resulting curve shown in FIG. 2 clearly demonstrates that with increasing temperature in the upper part of the column there is a surprisingly rapid increase of the toluene content in the liquid raffinate phase. In the range from 145° C. to 152.5° C. the concentration of toluene in the raffinate phase increases only from about 2 weight percent to about 4 weight percent. In contrast, in the range of from 164° C. to 165° C. the toluene content increases from about 17 weight percent to about 26 weight percent. Therefore it is crucial for the success of the extractive distillation to maintain the temperatures in the upper part of the column by means of accurate control in such a range that the temperature gradient is high, that is the temperature difference is high effecting a one percent change in the toluene concentration in the raffinate. In case a certain temperature value is surpassed, then the temperature gradient decreases to such an extent that the toluene concentration in the raffinate is hardly affected by a change in the temperature at a sensing plate in the upper part of the extractive distillation column.

Referring to this example it can be concluded that the toluene concentration in the raffinate should be maintained from about 2 to 4 weight percent in order to maximize the yield and that this requires to control the heat input at the bottom of the column such that the temperature of the liquid at the sensor plate is maintained within the range of from about 145° C. to 152.5° C.

A comparison example was run employing the temperature at the sensor plate (8th plate from the top) as the control signal for the total heat fed in at the bottom of the extractive distillation column. Despite application of the usual controllers and of an optimal control setting it was impossible to maintain the temperature of the liquid on the sensor plate within the above indicated range. There arose sinusoidal temperature variations and the concentration of toluene in the raffinate varied between 2 and 9 weight percent. Then in accordance with the present invention only about 10 to 11 percent of the heat fed to the extractive distillation column was controlled by the temperature at the sensor plate and the main quantity of the heat fed to the column was set to a fixed value. This setting allowed to maintain the toluene concentration in the raffinate from about 2.4 to 3.6 weight percent over extended times.

The above disclosures have specifically referred to the application of the present invention to the separation of aromatic hydrocarbons from material mixtures containing such compounds. As a matter of fact, the separation of aromatic compounds is a preferred field in extractive distillation. However, the application of the present invention is not limited to this field but allows for generally separating materials of different polarity and polarizability from each other by extractive distillation.

Other important application examples include the separation of mono-olefins and di-olefins and the separation of these compounds from non-aromatic hydrocarbons. Furthermore, the process of the present invention is not limited to employing a certain extractant.

As various possible embodiments might be made of the above invention, and as various changes might be made in the embodiment above set forth, it is to be understood that all matter herein described or shown in the accompanying drawings is to be interpreted as illustrative and not in a limiting sense.

While the invention has been illustrated and described as embodied in extractive distinction apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In the process for the operation of an extractive distillation column serving for the separation of aromatic hydrocarbon mixtures, using N-formylorpholine as extractant and operated without reflux, the improvement for controlling the amount of heat introduced into said column and therewith diminishing the loss of aromatic compounds comprising: supplying a first and major portion of the required heat to the bottom of said column, sensing the temperature at, at least one point located in the upper half of said column and supplying a second and minor portion of the required heat to the bottom of said column in response to said sensed temperature.

2. A process according to claim 1 wherein said first and major portion of heat comprises from about 80 to 90 percent of the required heat and said second and minor portion of heat comprises about 10 to 20 percent of the required heat supplied to said column.

3. A process according to claim 1 wherein said second and minor portion of heat supplied is controlled by the difference in the temperatures sensed at two different points each located in the upper half of said column.

4. A process according to claim 1 wherein said first and major portion of heat supplied is regulated in accordance with the amount of heat supplied by said second and minor heat supply.

5. A process according to claim 1 wherein said temperature sensing points are located at about 5 to 20% of the length of said column measured from the top thereof.

6. A process according to claim 1, wherein the heat for both said first and second heat supply is provided by at least one reboiler.

7. A process according to claim 6 wherein the heat for both said first and second heat supply is provided by at least two reboilers and wherein at least two different heat carriers are employed.

8. A process according to claim 6 wherein the heat for said second heat supply is provided by a separate reboiler provided with a separate heat carrier from that used to supply heat to said first and major heat supply.

9. An extractive distillation apparatus associated with means for controlling the temperature thereof comprising: an extractive distillation column, means for supplying extractant to the top of said column, means for supplying feed material to be separated in said column located at about the middle of said column, means for discharging overhead vapor from the top of said column, means for removing extractant containing extracted material from the bottom of said column, heat supplying means located at the bottom of said column including means for supplying a first and major portion of said heat and separate means for supplying a second and and minor portion of said heat to said column, sensing means for sensing the temperature located in the upper half of said column and control means for regulating the means for supplying the second and minor portion of heat responsive to said sensing means.

10. An extractive distillation apparatus according to claim 9 further including sensing means for sensing the amount of feed material introduced into said column and control means for regulating the means for supplying the first and major portion of heat to said column in response to said amount of feed material sensed.

11. An extractive distillation apparatus according to claim 9 wherein said means for supplying the first and major portion of heat to said column provides at least about 80 percent of said heat.

12. An extractive distillation apparatus according to claim 9 wherein said sensing means comprises a single sensor and is located in the upper third of said column.

13. An extractive distillation apparatus according to claim 9 wherein said sensing means comprises two sensors located at different levels in the upper half of said column, said control means is responsive to the difference in the two temperatures sensed; and regulates in response to said difference the means for supplying said second and minor portion of heat supplied to said column.

14. An extractive distillation apparatus according to claim 9 further comprising means linking said first and second heat supply means and means for regulating the heat supplied by said first heat supply means in response to the heat supplied by said second and minor heat supply means.

15. An extractive distillation apparatus according to claim 9 wherein said first and second means for supplying heat to said column comprise at least one reboiler.

16. An extractive distillation apparatus according to claim 9 wherein said first and second means for supplying heat to said column comprise at least two reboilers employing at least two different heat carriers.

17. An extractive distillation apparatus associated with means for controlling the temperature thereof comprising: an extractive distillation column, means for supplying extractant to the top of said column, means for supplying feed material to be separated in said column located at about the middle of said column, means for discharging overhead vapor from the top of said column, means for removing extractant containing extracted material from the bottom of said column, heat supplying means located at the bottom of said column including means for supplying a first and major portion of said heat and separate means for supplying a second and minor portion of said heat to said column, a gas chromatographic sensor for sensing the concentration of extract in the extractant, and control means for regulating the means for supplying the second and minor portion of heat responsive to said sensor.

* * * * *